Sept. 30, 1952       L. R. SMIDA       2,612,203

BUCKLE LINK APPLYING MACHINE FOR BALE STRAPS

Filed July 16, 1951       6 Sheets—Sheet 1

INVENTOR
Luverne R. Smida
BY
ATTORNEYS

Sept. 30, 1952 L. R. SMIDA 2,612,203
BUCKLE LINK APPLYING MACHINE FOR BALE STRAPS
Filed July 16, 1951 6 Sheets-Sheet 2

INVENTOR
Luverne R. Smida
BY *Webster & Webster*
ATTORNEYS

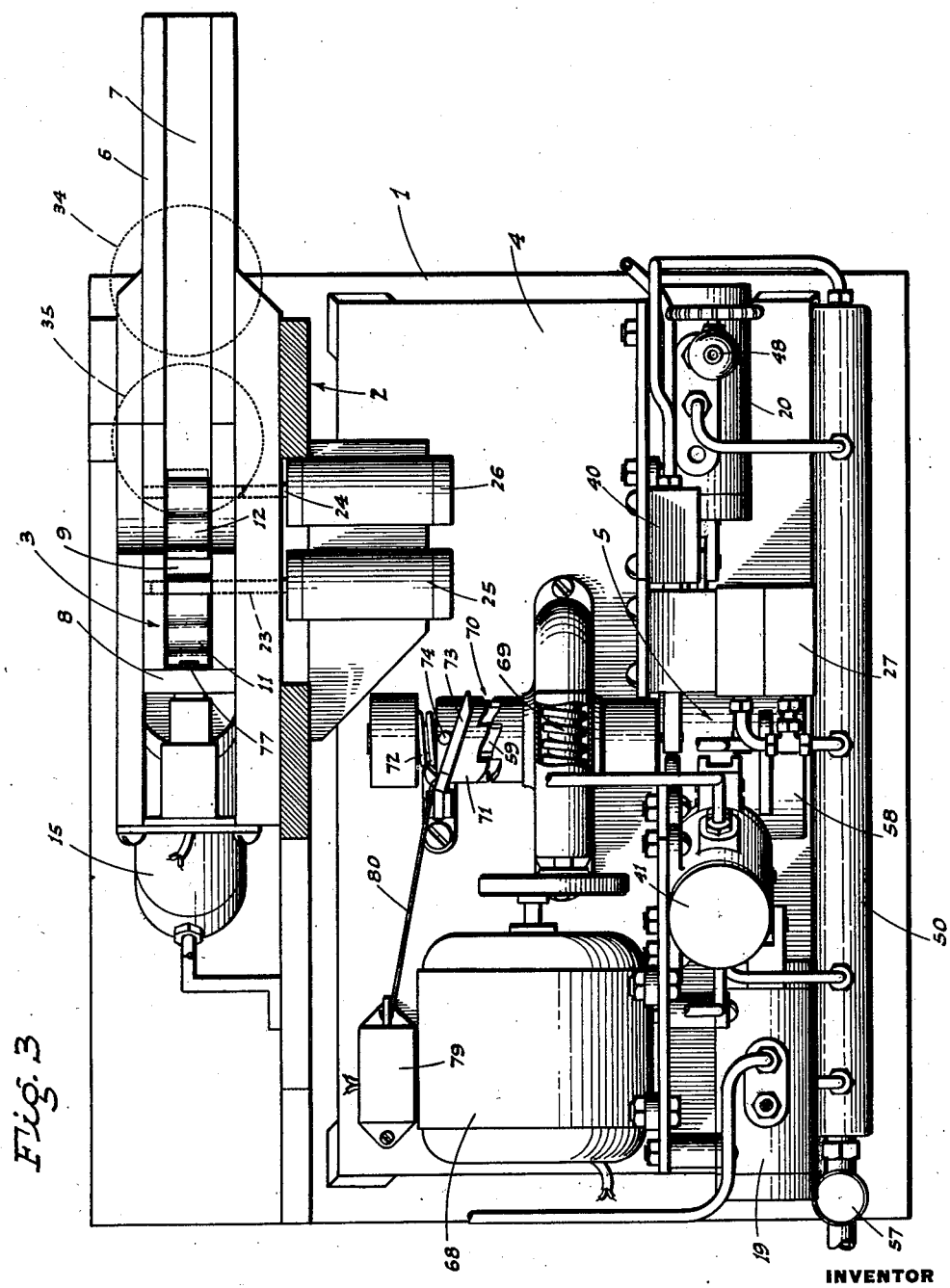

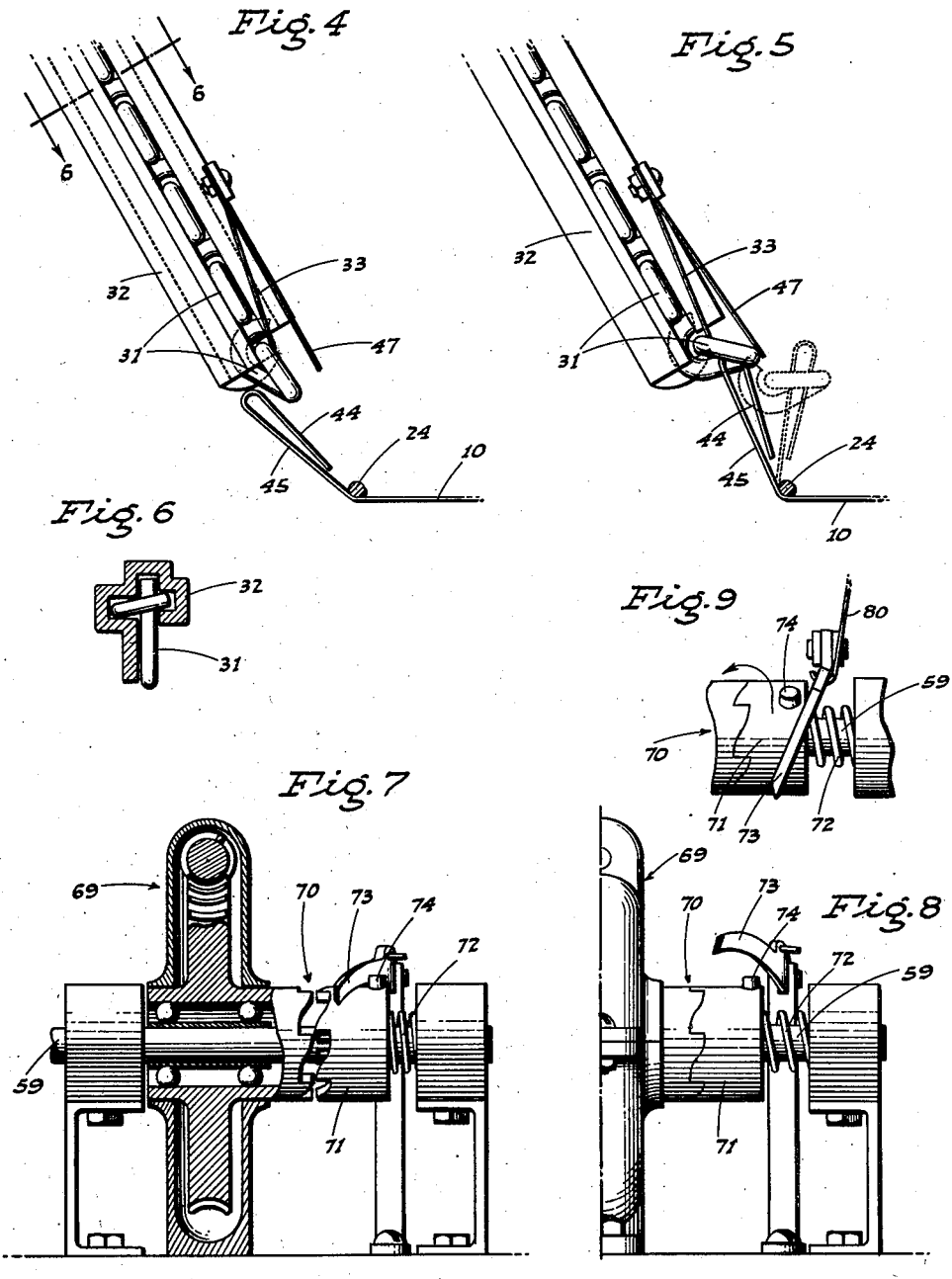

Sept. 30, 1952 L. R. SMIDA 2,612,203
BUCKLE LINK APPLYING MACHINE FOR BALE STRAPS
Filed July 16, 1951 6 Sheets-Sheet 5
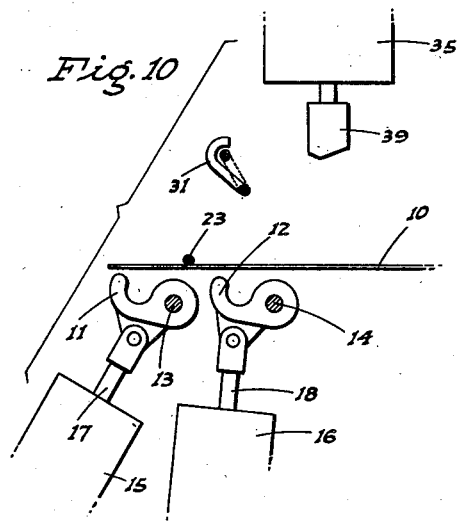
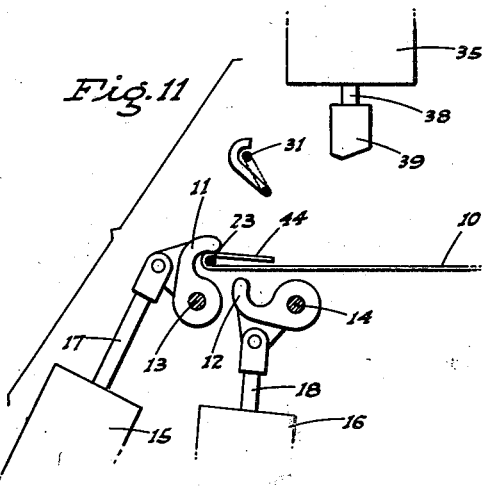
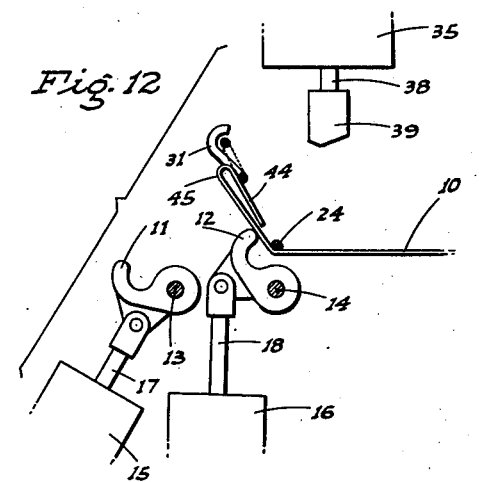
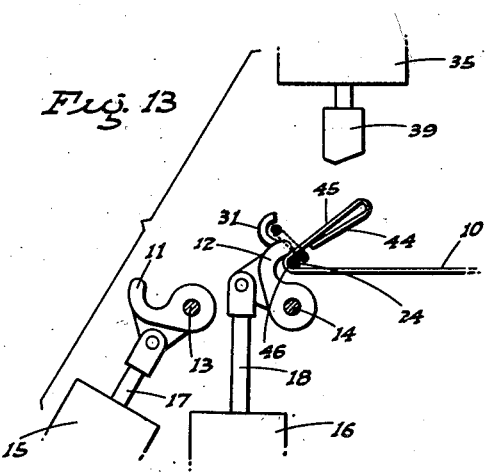
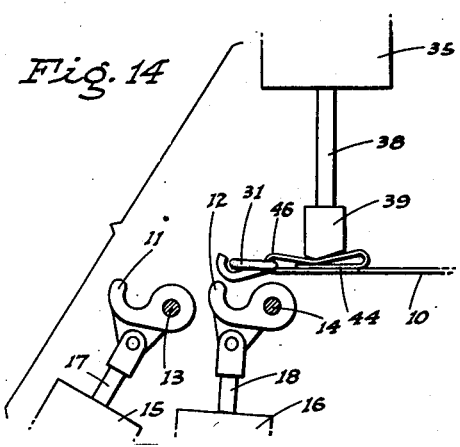
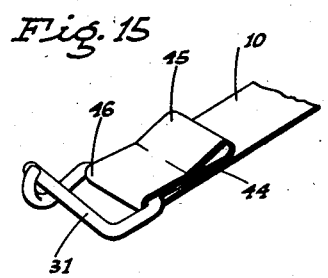
INVENTOR
Luverne R. Smida
BY
ATTORNEYS

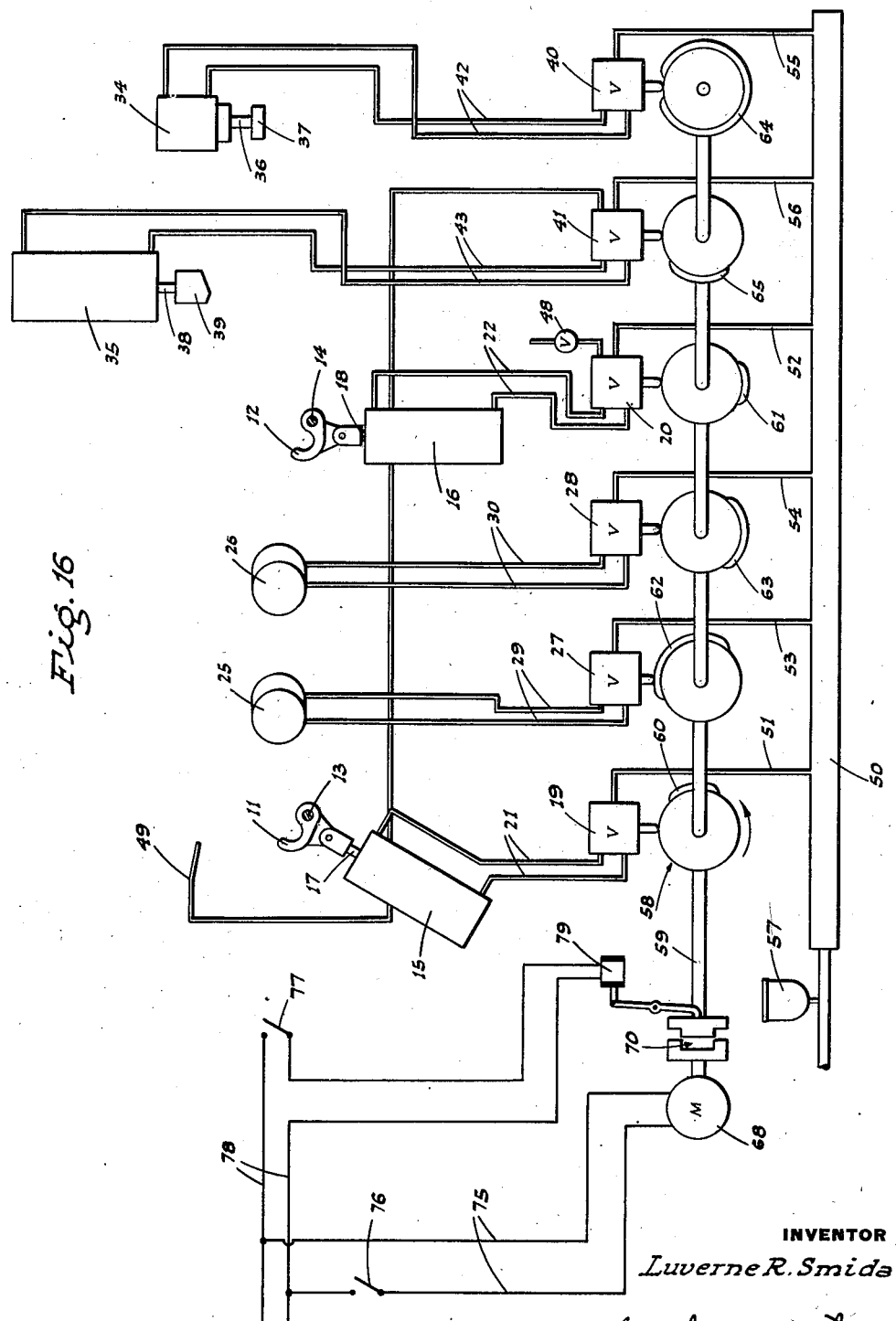

Patented Sept. 30, 1952

2,612,203

UNITED STATES PATENT OFFICE 2,612,203

BUCKLE LINK APPLYING MACHINE FOR BALE STRAPS

Luverne R. Smida, Stockton, Calif., assignor to W. W. Young, an individual doing business under the fictitious name and style of W. W. Young Co., Stockton, Calif.

Application July 16, 1951, Serial No. 236,938

8 Claims. (Cl. 153—1)

1

This invention relates to, and it is a major object to provide, a novel machine for attaching an end or buckle link to a preformed bale strap of metal; i. e. a strap such as is used to bind about cotton bales or the like, and which strap requires a buckle link at one end.

After being encircled about a bale the free end of the strap is passed through the buckle link and bent back to a holding position.

Another important object of the present invention is to provide a machine, for the purpose described, which is operative in sequential steps to first secure a preformed bale strap against motion; to then bend one relatively short end portion of the strap back upon itself; to subsequently again bend the strap back upon itself but to a greater extent whereby to form at the outer end a hinge for the buckle link, a link being automatically picked up from a chute by the second bent end portion of the strap and properly positioned in said hinge sleeve as the second bend is made; and finally the bent end portions of the strap are struck against the strap to secure the buckle link against escape.

A further object of this invention is to provide a buckle link applying machine, as in the preceding paragraph, wherein the successive steps of the operation are carried out by a series of fluid pressure actuated power cylinders, and novel strap engaging or working devices carried thereby; such power cylinders being actuated in predetermined timed order.

Another object of this invention is to provide a buckle link applying machine wherein the predetermined timed order of actuation of the power cylinders, as above, is accomplished through the medium of a bank of valves operated by a novel power driven cam assembly; all whereby the operation of the machine is wholly automatic through each cycle of operation.

It is also an object of the invention to provide a buckle link applying machine, for bale straps, which is positive in operation; smooth acting; and long-lived, with a minimum of servicing or repair being required.

A separate object of the invention is to provide a novel control circuit and automatic clutch assembly for the drive motor of the valve actuating mechanism.

Still another object of the invention is to provide a practical and reliable buckle link applying machine for bale straps, and one which will be exceedingly effective for the purpose for which it is designed.

These objects are accomplished by means of such structure and relative arrangement of parts

2 as will fully appear by a perusal of the following specification and claims.

In the drawings:

Fig. 3 is a sectional plan view on line 3—3 of Fig. 2.

Fig. 4 is a fragmentary side elevation of the link feeding chute, showing the second bend of the strap just before engagement with the lower link.

Fig. 5 is a similar view, but shows the second bend of the strap as engaging such link.

Fig. 6 is a cross section on line 6—6 of Fig. 4.

Fig. 7 is a fragmentary elevation, partly in section, of the clutch assembly, disengaged.

Fig. 8 is a similar view, but shows the declutching finger raised and the clutch in engagement.

Fig. 9 is likewise a similar view, but shows said finger as lowered to operative position after passage of the nub.

Figure 1:
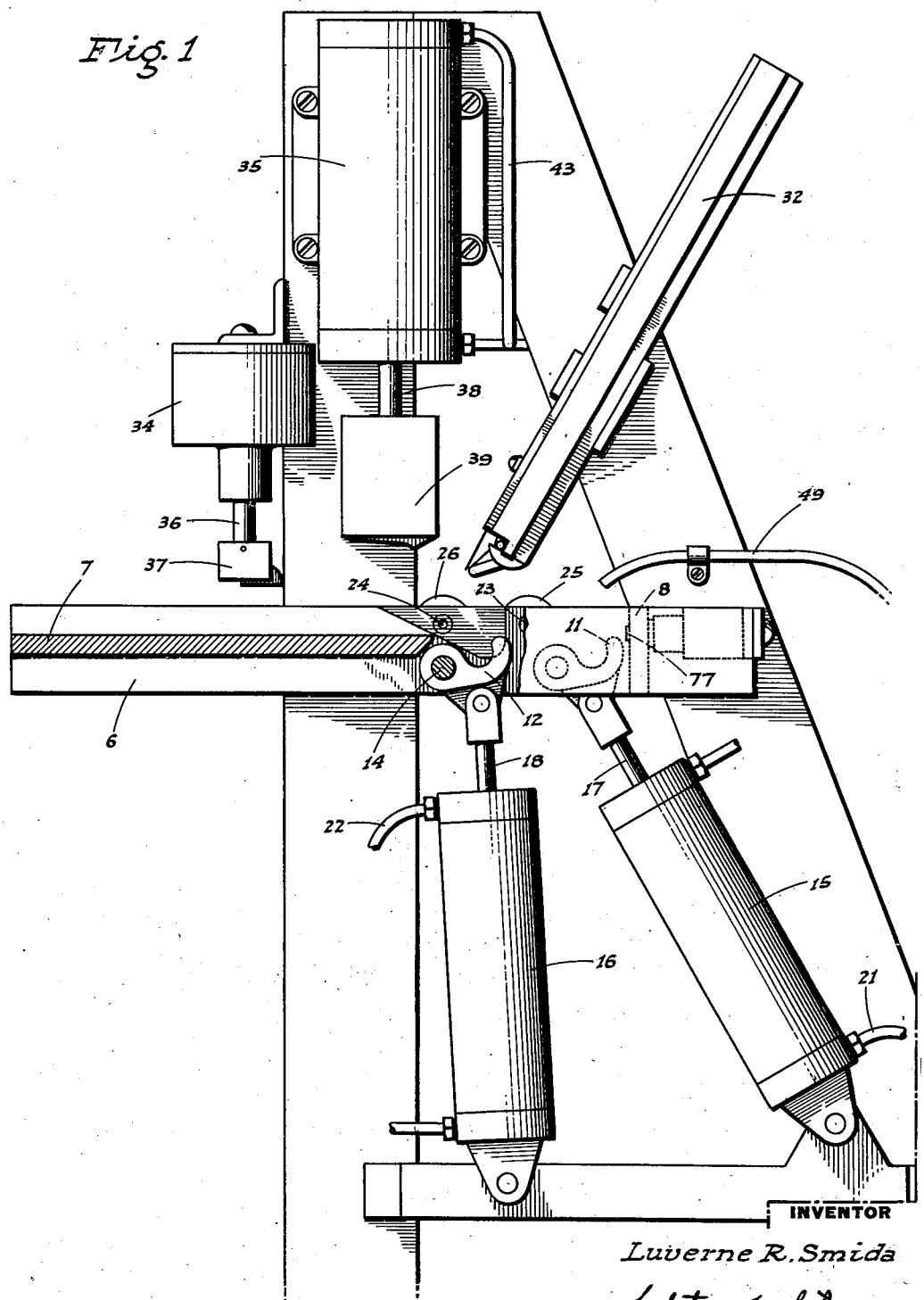
Fig. 1 is a side elevation, partly in section, of the strap bending and link applying mechanism of the machine.
Figure 2:
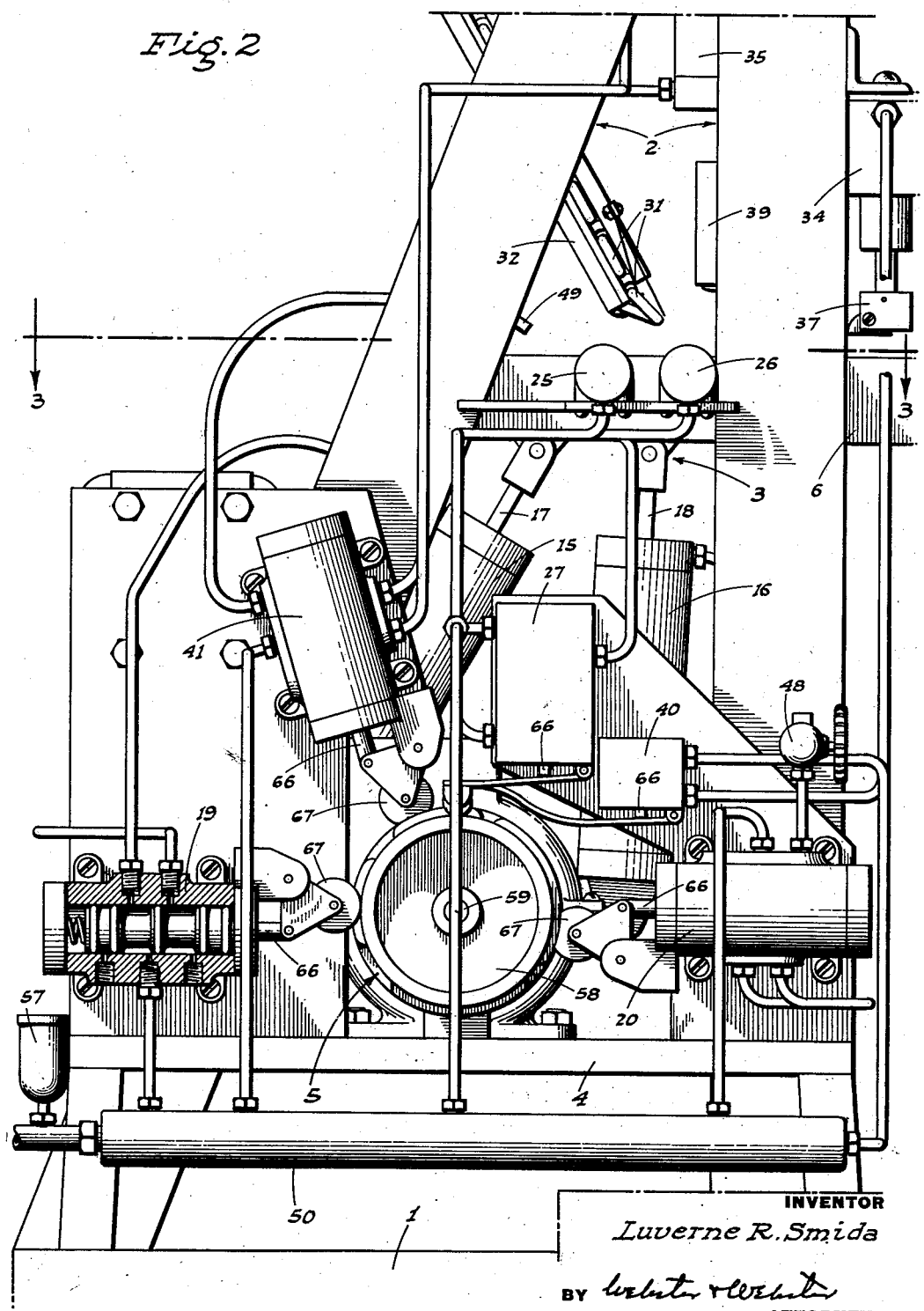
Fig. 2 is a similar view, but taken from the opposite side of the machine and showing the automatic valve actuating mechanism.

Figs. 10-14 inclusive are diagrammatic views showing the successive steps of the operation.

Fig. 15 is a perspective view of one of the straps with the link as attached.

Fig. 16 is a diagrammatic layout of the machine.

Referring now more particularly to the characters of reference on the drawings, the machine comprises a base 1 which is rectangular in plan; such base being fitted, intermediate opposite sides, with an upstanding mounting frame 2; such frame supporting—on one side thereof—the strap bending and link applying mechanism, indicated generally at 3.

Beyond the opposite side of the upstanding mounting frame 2 the base is fitted with a rectangular platform 4, on which platform is mounted an automatic valve actuating mechanism, indicated generally at 5. The strap bending and link applying mechanism 3 will first be described, and such mechanism is constructed and functions as follows:

The numeral 6 indicates a horizontal guide channel, including a bottom 7; such guide channel 6 being fixed to the upstanding mounting frame 2. At its inner end the guide channel 6 is formed with a stop 8, and for a distance ahead of such stop the bottom 7 of the channel is cut away whereby to form a vertically open throat 9.

The metal strap to which a buckle link is to be applied by the machine is indicated at 10, and such strap is initially engaged in the channel 6, resting on the channel bottom 7, spanning across the throat 9, and with one end of the strap abutting the stop 8.

A pair of longitudinally spaced bending heads 11 and 12, having concave working faces as shown, are pivoted—as at 13 and 14—in connection with the guide channel 6 for upward swinging motion in the throat 9 from a normally lowered or retracted position below the plane of the top surface of the bottom 7, to a raised, strap bending position projecting above such plane. The bending heads 11 and 12 are each actuated from below by a power cylinder; such cylinders being indicated at 15 and 16, respectively. The power cylinders 15 and 16 include upwardly projecting piston rods 17 and 18 which pivotally connect to the bending heads 11 and 12, respectively, in offset relation to the pivots of said heads whereby to impart proper throw to the latter. The power cylinders 15 and 16 are each pivotally mounted in connection with the mounting frame 2, as shown.

The power cylinders 15 and 16 are adapted to be reversibly actuated by means of corresponding four-way piston valves 19 and 20 which are normally spring-opened to exhaust; the valves 19 and 20 being connected to the power cylinders by pairs of pipes 21 and 22, respectively.

Within the zone of the throat but above the normally lowered position of the bending heads 11 and 12, the guide channel 6 is provided with a pair of longitudinally spaced, transverse anvil rods 23 and 24 which are normally retracted out of the channel but are adapted to project into the channel across the same slightly above the plane of the top surface of the channel bottom 7.

The transverse anvil rods 23 and 24 are actually extensions of the piston rods of a pair of power cylinders 25 and 26 secured to the upstanding mounting frame 2. By actuation of the power cylinders 25 and 26 the transverse anvil rods 23 and 24 can be caused to project from their normally retracted position to a position spanning between the sides of the guide channel 6.

The power cylinders 25 and 26 are adapted to be reversibly actuated by means of corresponding four-way piston valves 27 and 28 which are normally spring-opened to exhaust; the valves 27 and 28 being connected to the power cylinders 25 and 26 by pairs of pipes 29 and 30, respectively.

The purpose of the machine is to apply a standard type link 31 to the end of a metal bale strap 10, and a supply of such links is maintained directly above the throat 9 in a link feeding chute 32 disposed at a forward and downward incline to a lower end termination adjacent but short of the top of said throat 9. The link feeding chute 32 is channeled to receive a row of the links, with the lowermost link of said row projecting part way out of the lower end of the chute, opening in a rearward and downward direction, and being releasably maintained in such position by a holding spring 33 of leaf type.

A pair of downwardly working power cylinders 34 and 35 are mounted above the horizontal guide channel 6 in spaced relation lengthwise thereof but relatively close to the throat 9; the power cylinder 34 having a downwardly projecting piston rod 36 fitted at its lower end with a clamping head 37, which head is normally raised or retracted, but is adapted to be projected into the channel 6 upon actuation of the power cylinder 34.

Similarly, the power cylinder 35 has a downwardly projecting piston rod 38 fitted, on its lower end, with a hammer head 39 in a normally raised or retracted position but adapted to work into the guide channel 6 upon actuation of said power cylinder 35. The arrangement of the power cylinders 34 and 35 is such that the clamping head 37 works into the guide channel 6 a distance further from the throat 9 than the hammer head 39.

The power cylinders 34 and 35 are adapted to be reversibly actuated by means of corresponding piston valves 40 and 41 which are normally spring-opened to exhaust; the valves 40 and 41 being connected to the power cylinders by pairs of pipes 42 and 43, respectively.

When the described strap bending and link applying mechanism 3 is in operation it functions as follows; the successive steps of the operation being shown diagrammatically in Figs. 10–14 inclusive.

After a metallic bale strap 10 is engaged in the guide channel 6, abutting at one end against the stop 8, the power cylinder 34 is actuated by the valve 40 to cause the clamping head 37 to forcefully engage in the guide channel 6, clamping the strap 10 against the bottom of such channel for the full period of the strap bending and link applying cycle of operation.

Prior to the feeding of the strap into place to be bent, the power cylinder 25 is actuated by its valve 27 to project the transverse anvil rod 23 across the guide channel 6 above the strap, and this is followed by actuation of the power cylinder 15 by its valve 19, which causes the bending head 11 to be swung upwardly and forwardly, bending the outer end portion of the strap 10 about the anvil rod 23 and back onto the strap as a first bend 44 (see Fig. 11).

Thereafter, the power cylinder 25 acts to retract the transverse anvil rod 23, and the power cylinder 15 acts to lower the bending head 11; these actions being followed first by the power cylinder 26 being actuated by its valve 28 to advance the transverse anvil rod 24 across the guide channel 6, and then the power cylinder 16 is actuated by its valve 20, whereby to swing the bending head 12 upwardly.

Upon such upward swinging of the bending head 12 it engages the strap, including the first bend 44, and bends it about the transverse anvil rod 24, forming a second bend 45. The second bend 45 is of somewhat greater length than the first bend 44, whereby to form—beyond the free end of such first bend—what may be termed a hinge sleeve 46.

As the second bend 45 is formed under the influence of the bending head 12, such second bend swings upwardly and forwardly, and during the course of its travel first engages, and then projects through the opening of, the lowermost and exposed link 31 in the link feeding chute 32. When this occurs such lowermost link is drawn out of the chute, releases from the holding spring 33, and falls over and down on said second bend 45, being stabilized as it transfers from the chute 32 to the second bend 45 by a stabilizing spring 47 of leaf type which projects forwardly from the top of the lower end portion of the feeding chute 32. (See Figs. 4, 5, 12, and 13.)

After the second bend 45 is formed, as above, the power cylinder 26 acts to retract the anvil rod 24 and the power cylinder 16 acts to lower the bending head 12.

The second bend 45 as made by the bending head 12 is not in complete engagement with the strap so as to close the hinge sleeve 46 and prevent escape of the link 31. This closure is obtained by a downward striking motion of the hammer head 39 into the guide channel 6 (see Fig. 14); this being accomplished by actuation of the power cylinder 35 by the valve 41. The hammer head 39 immediately retracts after its downward blow, which blow on the bends 44 and 45 fully closes the same in engagement with the strap so that the link 31 is then secured in place against escape, projecting as desired beyond the strap end.

The last step in the cycle of each operation is actuation of the power cylinder 34 by its valve 40 to raise the clamping head 37, whereupon the strap 10, with the link 31 as applied thereto, may be readily withdrawn from the guide channel 6 preparatory to the next operation.

The exhaust for the valve 20 is fitted with a valve 48 which can be set to slow down operation of the power cylinder 16, which slowing down is necessary in order to permit the second bend 45 to engage and pick up the lowermost link 31 in the link feeding chute 32. Also, the exhaust for the valve 41 is connected to an exhaust pipe 49 which discharges into the throat 9, whereby after the hammer head 39 strikes into the guide channel 6, scale from the strap bends is effectively blown clear.

With the foregoing strap bending and link applying mechanism, links can be applied to metal bale straps rapidly and positively; the operation being smooth and effective in its successive steps.

In order to actuate the power cylinders 15, 16, 25, 26, 34, and 35 at the correct moments and for the proper lengths of time during each cycle of operation, the valves 19, 20, 27, 28, 40, and 41, respectively, are controlled by the automatic valve actuated mechanism, indicated generally at 5; which mechanism is constructed and functions as follows:

The power cylinders 15, 16, 25, 26, 34, and 35 are all pneumatically actuated; the corresponding valve 19, 20, 27, 28, 40, and 41 being fed air pressure from a manifold 50 through pipes 51, 52, 53, 54, 55, and 56.

Air pressure is maintained in the manifold 50 from a source not shown, and a certain amount of lubricant is fed with the compressed air from a lubricant chamber 57.

The valves 19, 20, 27, 28, 40, and 41 are mounted generally radially of, and at spaced points along, a cam drum 58 on a shaft 59 journaled in connection with the platform 4. The cam drum 18 is formed, on its periphery, with valve actuating lobes 60, 61, 62, 63, 64, and 65, which lobes are in a position, and of a circumferential extent, to actuate the corresponding valves at the proper moment and for the necessary length of time requisite to attain the described operation of the related power cylinders.

The above enumerated valves are—as previously indicated—of four-way piston type, normally spring-opened to exhaust, and each includes an axially shiftable rod 66 connected to a roller assembly 67 which rides the related lobe on the cam drum 58.

The cam drum 58 is driven through one full turn for each cycle of operation of the machine; the shaft 59 being driven from an electric motor 68 on platform 4 by means of a worm gear box 69 and a clutch unit 70 between the output hub of such gear box and said shaft 59. The clutch unit 70 is of toothed type and includes an axially shiftable clutch collar 71 on the shaft 59; there being a spring 72 which tends to engage said clutch collar, which is splined on the shaft 59, with the driven portion of the clutch unit 70 included with the gear box 69.

A pivotally mounted, diagonally disposed declutching finger 73 normally rests on the clutch collar 71; there being a radial nub 74 on such collar which normally engages and rides the finger 73 to cause disengagement of the clutch unit 70.

The electric motor 68 is energized by a circuit 75 having a manual switch 76 therein, the motor being placed in operation by closing of said switch 76. However, at the outset initial operation of the motor 68 does not start the drive of the shaft 59 or the cam drum 58; this for the reason that the clutch unit 70 is normally disengaged, as aforesaid.

The cycle of operation is begun upon initial insertion of a strap 10 into the guide channel 6, and particularly when the strap end engages the stop 8. When the strap first end-engages the stop 8 it strikes and depresses a push button switch 77, which closes the energized circuit 78 of a solenoid 79 mounted adjacent the electric motor 68. When such solenoid 79 is thus energized it pulls on a link 80 connected to the declutching finger 73, swinging the latter to a raised, non-working position. When this occurs the nub 74 is freed and the spring 72 engages the clutch unit 70, whereupon the shaft 59 and cam drum 58 begin the full turn which each cycle of operation contemplates.

When the first bend 44 is made on the end of the strap 10, the push button switch 77 is released, whereupon the solenoid 79 deenergizes and declutching finger 73 again falls into engagement with the clutch collar 71. However, in the interim the radial nub 74 has traveled a distance so that it is positioned behind the declutching finger 73 and can continue rotating with said clutch collar 71. As the full turn of the clutch collar 71 approaches completion, the radial nub 74 again rides into engagement with the front of the declutching finger 73, shifting the clutch collar 71 axially in a direction to disengage the clutch unit 70. In this manner the described automatic valve actuating mechanism can make only one turn—as is desired—for each cycle of operation of the machine; the clutch then disengaging and remaining in such condition until the subsequent strap is fed into the guide channel 6 and engages and closes the push button 77.

As previously stated, the anvil rod 23 is projecting across the channel 6 before the strap is fed into bending position. Said rod therefore aids in guiding the vertically flexible strap into place, and enables the first bending operation to start the instant the strap contacts switch button 77.

It will thus be evident that there is provided a very effective automatic valve actuating mechanism 5 for working the valves 19, 20, 27, 28, 40, and 41 in the predetermined timed relationship required for the automatic operation of the strap bending and link applying mechanism.

From the foregoing description it will be readily seen that there has been produced such a device as substantially fulfills the objects of the invention as set forth herein.

While this specification sets forth in detail the present and preferred construction of the device, still in practice such deviations there-from may be resorted to as do not form a departure from the spirit of the invention, as defined by the appended claims.

Having thus described the invention, the following are claimed as new and useful, and upon which Letters Patent are desired:

1. A link applying machine for metallic bale straps, comprising a support for a strap, means to releasably clamp the strap to the support, the latter having an opening exposing an end portion of the clamped strap, a pair of longitudinally spaced bending heads, means mounting the bending heads adjacent and normally clear of said end portion of the strap but for swinging motion in the opening to engage and bend back corresponding parts of said end portion of the strap, a pair of longitudinally spaced normally retracted bending anvils related to the bending heads, means mounting the anvils for projection across the opening for cooperation with the related bending heads whereby the latter when swung engage and bend back said corresponding parts of the strap about said anvils, means to swing the bending heads and project related anvils in timed relation to form a first bend and a second bend in succession, and means to apply a link onto the second bend prior to completion thereof.

2. A link applying machine, as in claim 1, in which the bending heads and anvils are disposed so that the second bend is formed longer than the first bend whereby to produce a hinge sleeve beyond the first bend, the link falling to place in said sleeve, and hammer means operative to strike the bends and the strap together inwardly of said sleeve after both bends are formed and the link is in place.

3. A link applying machine, as in claim 1, in which said last named means is a chute terminating adjacent said opening, and means to retain a row of free links in the chute with the lowermost link releasably exposed in the path of bending motion of the second bend whereby, when made, said second bend engages through and picks up said lowermost link.

4. A link applying machine for metallic bale straps, comprising a support for a strap, means to releasably clamp the strap to the support, the latter having an opening exposing an end portion of the clamped strap, a pair of longitudinally spaced bending heads, means mounting the bending heads adjacent and normally clear of said end portion of the strap but for swinging motion in the opening to engage and bend back corresponding parts of said end portion of the strap, a pair of longitudinally spaced normally retracted bending anvils related to the bending heads, means mounting the anvils for projection across the opening for cooperation with the related bending heads whereby the latter when swung engage and bend back said corresponding parts of the strap about said anvils, separate power cylinders connected to the bending heads and bending anvils operative to swing said heads and project said anvils in timed relation to form a first bend and a second bend in succession, and means to apply a link onto the second bend prior to completion thereof.

5. A link applying machine for metallic bale straps, comprising a fixed longitudinal guide channel having a stop therein, a clamping head mounted for movement into the guide channel some distance from the stop to clamp a strap in said channel with one end initially abutting said stop, the bottom of the guide channel being open adjacent the stop to form a throat, a pair of longitudinally spaced bending heads pivoted in connection with the guide channel for swinging upward in the throat from a starting position below the corresponding end portion of the strap, a pair of longitudinally spaced normally retracted transverse anvil rods mounted in connection with the guide channel for sliding projection across the same above related bending heads whereby the latter when swung upwardly engage and bend back corresponding parts of the strap about said anvils whereby to form a first bend and a second bend, a separate power cylinder connected in actuating relation to the clamping head and each of the bending heads and anvils, means for actuating said power cylinders in a predetermined cycle, and means to apply a link onto the second bend prior to completion thereof.

6. A link applying machine for metallic bale straps, comprising a fixed longitudinal guide channel having a stop therein, a clamping head mounted for movement into the guide channel some distance from the stop to clamp a strap in said channel with one end initially abutting said stop, the bottom of the guide channel being open adjacent the stop to form a throat, a pair of longitudinally spaced bending heads pivoted in connection with the guide channel for swinging upward in the throat from a starting position below the corresponding end portion of the strap, a pair of longitudinally spaced normally retracted transverse anvil rods mounted in connection with the guide channel for sliding projection across the same above related bending heads whereby the latter when swung upwardly engage and bend back corresponding parts of the strap about said anvils whereby to form a first bend and a second bend, a hammer head mounted for movement into the guide channel between the throat and clamping head, a separate power cylinder connected in actuating relation to the clamping head, hammer head and each of the bending heads and anvils, means for actuating said power cylinders in a predetermined cycle, and means to apply a link onto the second bend prior to completion thereof.

7. A link applying machine for metallic bale straps, comprising a fixed longitudinal guide channel having a stop therein, a clamping head mounted for movement into the guide channel some distance from the stop to clamp a strap in said channel with one end initially abutting said stop, the bottom of the guide channel being open adjacent the stop to form a throat, a pair of longitudinally spaced bending heads pivoted in connection with the guide channel for swinging upward in the throat from a starting position below the corresponding end portion of the strap, a pair of longitudinally spaced normally retracted transverse anvil rods mounted in connection with the guide channel for sliding projection across the same above related bending heads whereby the latter when swung upwardly engage and bend back corresponding parts of the strap about said anvils whereby to form a first bend and a second bend, a separate power cylinder connected in actuating relation to the clamping head and each of the bending heads and anvils, means for actuating said power cylinders in a predetermined cycle, a chute above and terminating at its lower end adjacent the throat but above the anvils, and means to retain a row of free links in the chute with the lowermost link releasably exposed in the path of bending motion of the second bend whereby, when made, said second bend engages through and picks up said lowermost link.

8. A link applying machine, as in claim 7, including a pair of leaf springs projecting from the lower end of the chute; one spring bearing on the lowermost link in a manner to releasably hold the same in position for engagement by said second bend, and the other spring engaging said lowermost link in stabilizing relation as such link is picked up by said second bend.

LUVERNE R. SMIDA.

REFERENCES CITED

The following references are of record in the file of this patent:

UNITED STATES PATENTS

| Number | Name | Date |
|---|---|---|
| 670,230 | Hartshorn | Mar. 19, 1901 |
| 1,128,517 | Rogers | Feb. 16, 1915 |
| 1,434,470 | Abramsen | Nov. 7, 1922 |
| 2,159,851 | Hicks | May 23, 1939 |
| 2,241,807 | Cotner | May 13, 1941 |
| 2,290,626 | Bosomworth | July 21, 1942 |
| 2,360,630 | Von Hofe | Oct. 17, 1944 |
| 2,475,432 | Marihart | July 5, 1949 |
| 2,489,377 | Hendrixson | Nov. 29, 1949 |
| 2,500,933 | Dailey | Mar. 21, 1950 |
| 2,541,232 | Forster | Feb. 13, 1951 |